United States Patent Office 3,089,032
Patented May 7, 1963

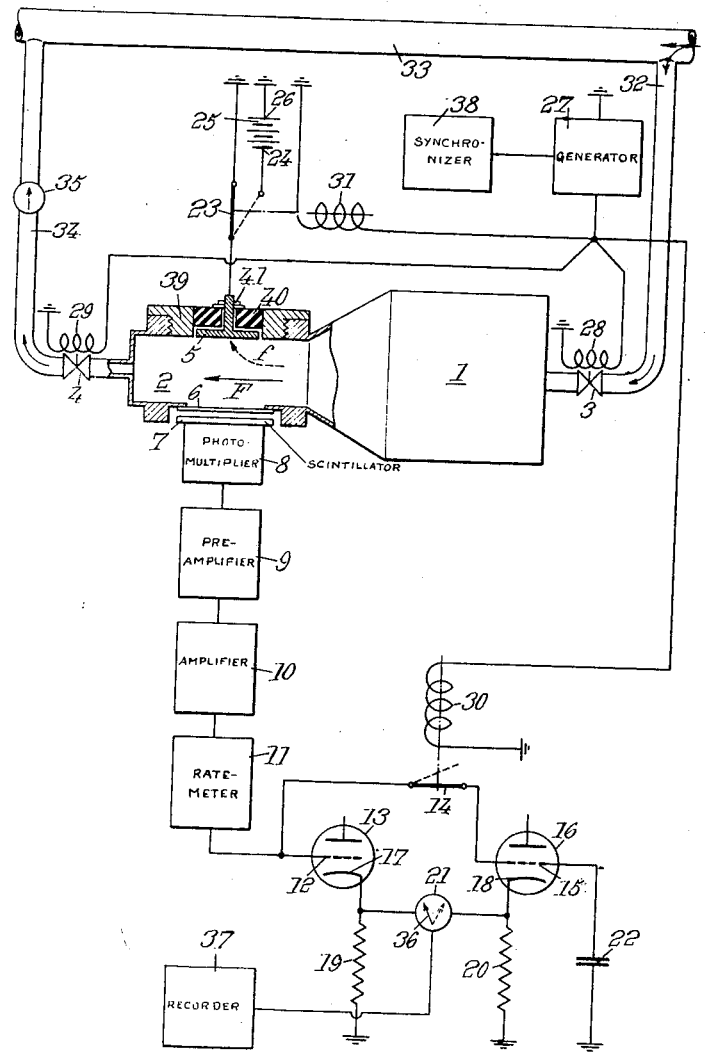

3,089,032
SELECTIVE MEASUREMENT OF SHORT-LIVED FISSION PRODUCTS IN A GAS FLOW
Jean Goupil, Fontenay-aux-Roses, and André Roguin, Antony, France, assignors to Commissariat a l'Energie Atomique, Paris, France
Filed Dec. 2, 1958, Ser. No. 777,731
Claims priority, application France Dec. 4, 1957
7 Claims. (Cl. 250—71.5)

The invention concerns the selective measurement of the amount of fission products in gases and more specifically in the effluent of nuclear reactors cooled by gases (as air, carbon dioxide or helium) and also of the particle accelerators.

It is well known that the detection or measure of fission products in the cooling gas of a gas-cooled nuclear reactor, particularly of fission products immediately after they enter said cooling gas, is very useful for monitoring the correct working of such a reactor; it is possible, by this method, to detect very quickly an incorrect working of the reactor, and more specifically a burst in the jackets or cans surrounding the bodies of fissile or fertile material, such burst resulting in the projection of radioactive products in the cooling gas. If the detection of the fission products in the cooling gas is prompt, it is possible to take all necessary steps for ending the abnormal working of the reactor, e.g. by unloading the burst element or elements, or even by completely stopping the reactor if necessary.

Several types of devices for detecting and/or measuring the fission products in gases are well known, said devices including for example Geiger-Müller counters, scintillation counters or ionization chambers. These known devices have generally several drawbacks which prevent a quick and safe detection of the arrival of fission products in a gas flow due to:

Their low sensitivity,
The increasing indication thereof when the cooling gas of a neutronic reactor is recycled through said reactor,
Especially their poor discrimination of the useful signals from the parasitic signals,
Their maintenance difficulty and their bulk.

In fact, the radioactivity, at a given moment, of a gas leaving a nuclear reactor is constituted mostly by the sum of the radioactivity of the radioactive isotopes which were formed from the stable constituent atoms of the cooling gas by neutronic bombardment thereof in the nuclear reactor and of the fission products which entered the cooling gas.

But these fission products are of two kinds:
(a) The long-lived fission products which, when the gas is recycled through a nuclear reactor, possess a radioactivity which persists in the gas a long time after the passage of such long-lived fission products in the cooling gas,
(b) The short-lived fission products having a radioactivity which does not subsist for a long period after their passage in the cooling gas, even if said gas is recycled.

It is easily understood that the long-lived fission products falsify the measures, due to the fact that the activity of such fission products, which arrived a long time before in the cooling gas, is added to the activity of long- and short-lived fission products which have just passed in said gas and which has to be detected.

The only radioactivity that should be measured, if the passage of fission products in the gas has to be detected immediately, is the radioactivity of the short-lived fission products.

The present invention has therefore for an object to provide a device for the selective measurement of the amount of short-lived fission products in a gas flow so as to detect very quickly the passage of fission products in said gas flow or the increase of the fission products content in said gas flow.

The invention is particularly useful for detecting and measuring fission products in the nuclear reactors, for example after the burst of a can, and in the particle accelerators, for example with a view of determining the formation of a fission product as a result from a chain reaction, e.g. the production of radon.

The device according to the invention is based on the fact that the short-lived fission products resulting from chain reactions caused by the bombardment of fertile and/or fissile matters (as uranium and/or plutonium) by neutrons, and in particular by thermal neutrons, decay in a few seconds (generally in 1–2 seconds) in radioactive ions (for example the kryptons and xenons, which are radioactive gases resulting from a fission reaction, decay in rubidium and cesium ions).

The device, according to the invention, for selectively measuring the amount of short-lived fission products in a gas flow, comprises, in combination, a decay prechamber, a detection chamber disposed downstream said prechamber, duct means for circulating at least a portion of said gas flow successively through said decay prechamber and said detection chamber, detecting means for determining the radioactivity in said detection chamber, ion collecting means for concentrating, when energized, ions in a particular area of said detection chamber, valve means for preventing, when energized, the circulation of said gas flow through said chamber, control means for energizing simultaneously said ion collecting means and said valve means, and comparison means for comparing the determination of said detecting means before and after the operation of said control means.

The aforesaid and other objects, features and advantages of the invention will be more easily and fully understood from the illustration of one embodiment of a short-lived fission products selective measurement device according to the invention, being understood that the invention is not restricted to the details of the illustrated and described embodiment, but that it is susceptible to modifications and adaptations.

In the attached single FIGURE is shown schematically one illustrative embodiment of a device according to the invention, adapted for detecting burst slugs in a heterogeneous reactor comprising jacketed uranium slugs in a graphite lattice and cooled in a closed circuit by carbon dioxide, said device allowing such a detection by a selective measurement of the short-lived fission products in the effluent cooling gas.

Said device comprises first a decay prechamber 1 and, downstream thereof, a detection chamber 2, two valves 3 and 4 controlling the passage therethrough of the gas flow wherein the presence of fission products is to be detected quickly and safely, said flow arriving by duct 32 and remaining in decay prechamber 1 about 1–2 seconds so that the radioactive short-lived gaseous fission products (as kryptons and xenons) can effectively decay in radioactive ions (as rubidiums and cesiums).

The detection chamber 2 comprises essentially a detachable collection or precipitation element, such as an electrode 5, and a "window" 6 transparent to beta-rays placed opposite said electrode 5 and in front of which is disposed a scintillating element or "phosphor" 7 sensible particularly to beta-rays, e.g. a plastic "phosphor" as a solution of tetraphenyl butadiene in polystyrene; to this scintillating element is associated, in the known manner, the entrance window of a photomultiplier 8 comprising, as usually, a photo-cathode which transforms the light pulses produced in the scintillating element, especially by the beta-rays leaving chamber 2 through window 6, into electrons and a series of dynodes which multiply by a very high factor (generally above 1,000,000) the number of said electrons.

The photomultiplier 8 feeds an electronic channel comprising essentially a preamplifier 9, an amplifier 10 and a ratemeter 11 (of the known type, generally used in the detection of nuclear radiations) which delivers a signal which is proportional to the average counting rate during determined period of time, i.e. to the mean quantity of beta rays emitted in a time unit, as the second or minute, by the contents of detection chamber 2.

The output of ratemeter 11 is applied on the one hand directly, to grid 12 of a first triode 13 and, on the other hand through a switch 14, to grid 15 of a second triode 16, said grid 15 being grounded through a capacitor 22 or other element capable of storing electrical energy. The cathodes 17 and 18 of triodes 13 and 16 respectively are grounded through resistors 19 and 20, a voltmeter, or other differential apparatus indicating the potential difference between cathodes 17 and 18, being disposed in 21 between said cathodes. A recording apparatus 37 may also be provided for inscribing the variations of said potential in course of time. In fact the triodes 13 and 16 and the associated elements constitute a balancing device determining the activity of only the short-lived fission products.

At last, a control channel is provided for controlling valves 3 and 4, switch 14 and a switch 23 which allows to connect electrode 5, either to the negative terminal 24 of a source of potential 25 having the positive terminal thereof grounded, or directly to the ground; source 25 is a source of D.C. high voltage, e.g. of 1,000–2,000 volts.

This control channel which may be of any known type, comprises, for example, a generator 27, having the operation thereof controlled by a synchronizer 38 and energizing simultaneously relay coils 28, 29, 30 and 31 which have for an object, when energized, to close valve 3, to close valve 4, to open switch 14 and to bring the switch 23 from the position shown in full lines to the position shown in dotted lines in the drawings, respectively.

The device which has been described operates as follows.

A gas flow arrives through valve 3 (being, for example, picked up by pipe 32 from a main duct 33 in which circulates the totality of the gas flow) wherein the fission products arrival or density increase has to be detected, and passes successively through decay prechamber 1, wherein the gaseous short-lived fission products decay in radioactive ions, and detection chamber 2, before leaving through valve 4 (for being, for example, returned through a pipe 34, by means of a pump or blower 35, to the main duct 33), both valves 3 and 4 being opened. During this first period the gas passes through chamber 2 as shown by arrow F in full lines, switch 23 being in the position shown in full lines thereby leaving unenergized electrode 5. The assembly of scintillating element 7 and photomultiplier 8 detects the general activity of the gas circulating in chamber 2 in the direction of arrow F.

This first period of measurement controlled by synchronizer 38 which renders inoperative generator 27, may, for example, last 30 seconds in order to permit the formation of homogeneous conditions in chamber 2 and also a safe and accurate operation of ratemeter 11 which, during this first period, delivers simultaneously on control grids 12 and 15 (switch 14 being closed) a signal which is representative of the mean gas general activity, the electrical energy stored by capacitor 22 being function of said activity. The indicator 21 gives a null indication (the needle 36 thereof occupying the position shown in full lines) due to the fact that the switch 14 is in the position shown in full lines and that, consequently, the potential of grids 12 and 15 is the same.

After this first period of about 30 seconds for example, during which the ungrounded plate of capacitor 22 has been bought to a potential representative of the mean general activity of the gas flow, an energizing current is fed by generator 27, under the control of synchronizer 38, in relay coils 28, 29, 30 and 31, thereby closing valves 3 and 4, opening switch 14 (which takes the position shown in dotted lines) and energizing (e.g. by bringing to a negative potential of about 1,000 to 2,000 volts) electrode 5, the switch 23 taking the position shown in dotted lines.

The rubidium and cesium ions in the chamber 2, resulting from a decay in prechamber 1, are attracted by electrode 5 as shown by arrow $f$ and the assembly scintillator 7-photomultiplier 8 detects the general activity of the gas increased by the special extra activity of the ions collected or precipitated on electrode 5, this sum being called the enhanced activity hereunder. The output of ratemeter 11 is therefore now increased by a quantity which is representative of the special radioactivity of the collected ions; as switch 14 is opened, the difference between the potential of grid 12 (representative of the enhanced activity) and the potential of grid 15 (the previous potential which has been stored in capacitor 22 and which is representative of said general activity) is detected by indicating apparatus 21, the needle 36 thereof occupying now the position shown in dotted lines and showing the extra activity of the collected ions i.e., if apparatus 21 is adequately calibrated, the quantity of short-lived fission products present in the gas flow. This quantity can also be recorded by a recorder 37 of known type. It is easily seen therefore that indicating apparatus 21 shows and recorder 37 records a value which is a function only of the activity of the collected ions.

This second period, i.e. the period during which generator 27 energizes relay coils 28, 29, 30 and 31, may be shorter than the first period, because a period of time of about 8–10 seconds is sufficient for realizing a precise determination of the counting rate after the electrode 5 is energized.

The synchronizer 38 may be constituted by a clock device alternatively cutting off, for periods of e.g. 30 seconds, generator 27 and energizing, for periods e.g. of 10 seconds, said generator and so on cyclically.

If some radioactive particles having a long life would accumulate on electrode 5 and reduce the accuracy and selectivity of the device according to the invention, it is easy to remove and change said electrode, due to its particular detachable assembling, by unscrewing closure cap 39 (in which is enclosed an insulating ring 40) and removing plug 41. Experience has shown that, with the illustrated device in detecting burst cans in a nuclear reactor cooled by carbon dioxide in closed circuit, it is sufficient to change electrode 5 about every 1,000 hours for ensuring to the device all its selectivity.

It appears therefore that a device according to the invention detects quickly and safely the activity variations in a gas flow due to fission products without any moving part, whereas the prior art gas monitoring systems, e.g. the Calder Hall gas sampling system (described in the November 1956 issue of the British monthly review "Nuclear Power" pages 287–289) comprises a motor-driven precipitator wire, the operation of which may fail from time to time, without including a true parasitic signals balancing device corresponding to the balancing device, comprising triodes 13 and 16, in the embodiment of the invention.

Although this invention has been described with reference to a schematic embodiment thereof, it is to be distinctly understood that various modifications and adaptations of the arrangements herein disclosed, may be made as may readily occur to persons skilled in the art, without constituting a departure from the spirit or scope of the invention, as defined in the objects and in the appended claims.

For example the radioactivity measuring means (radiation counter or detector and associated electronic circuit), the balancing means and the control means could be modified as will readily occur to someone skilled in the art without altering the scope of the invention. In particular the control means could realize the opening of normally closed valves 3, 4 and corresponding actions on switches 14 and 23 during the first period of operation, instead of realizing the closing of valves 3 and 4 and the above-mentioned actions on switches 14 and 23 during the second period of operation.

What we claim is:

1. Device for selectively measuring the amount of short-lived fission products in a gas flow comprising, in combination, a decay prechamber, a detection chamber disposed downstream said prechamber, duct means for circulating at least a portion of said gas flow successively through said decay prechamber and said detection chamber, detecting means for determining the radioactivity in said detection chamber, ion collecting means for concentrating, when energized, ions in a particular area of said detection chamber, valve means for preventing, when energized, the circulation of said gas flow through said chamber, control means for energizing simultaneously said ion collecting means and said valve means, and comparison means for comparing the determination of said detecting means before and after the operation of said control means, said comparison means comprising a first and a second triode each including one cathode grounded through a resistor, said cathodes being connected through an apparatus adapted to indicate the potential difference therebetween, whereas the grids are connected through a switch, the grid of said first triode being furthermore connected to the output of said detecting means and the grid of said second triode being connected to one plate of a capacitor having the other plate thereof grounded.

2. Device according to claim 1, wherein said control means also control the opening of said switch disposed between said grids.

3. Device for selectively measuring the amount of short-lived fission products in a gas flow, comprising, in combination, a first and a second chamber adapted to be traversed in series in this order by at least part of said gas flow at a speed such that the short-lived fission products present therein decay in said first chamber in radioactive ions, valve means located upstream said first chamber and downstream said second chamber and adapted to prevent, when energized, the circulation of said part of said gas flow through said first and second chambers, a nuclear radiation detector for determining the radioactivity in said second chamber, ion collecting means located in said second chamber and adapted to collect ions when energized, storing means for storing the determination of radioactivity made by said nuclear radiation detector, control means for energizing simultaneously said ion collecting means and said valve means, and comparison means for comparing the determination of said nuclear radiation detector before the actuation of said control means, which is stored in said storing means, and the determination of said nuclear radiation detector after the actuation of said control means.

4. Device according to claim 3, wherein said second chamber comprises a window transparent selectively to beta rays and wherein said nuclear radiation detector is a scintillation detector selectively sensitive to beta rays feeding a pulse-rate meter delivering a continuous signal which is a function of the rate of beta rays originating from said second chamber and passing through said window.

5. Device according to claim 3, wherein said ion collecting means are constituted by an easily-removable electrode placed in said chamber, by a source of high voltage direct current and by a switch allowing to connect said electrode, either to the negative terminal of said source, or to ground.

6. Device according to claim 3, wherein the length of said first chamber in feet divided by the circulation speed of said gas flow through said first chamber in feet per second is at least equal to 1.

7. Device for selectively measuring the amount of short-lived fission products in a gas flow, comprising, in combination, a first and a second chamber adapted to be traversed in series in this order by at least part of said gas flow at a speed such that the short-lived fission products present therein decay in said first chamber in radioactive ions, valve means located upstream said first chamber and downstream said second chamber and adapted to prevent, when energized, the circulation of said part of said gas flow through said first and second chambers, a nuclear radiation detector for determining the radioactivity in said second chamber, ion collecting means located in said second chamber and adapted to collect ions when energized, a capacitor for storing the determination of radioactivity made by said nuclear radiation detector, control means for energizing simultaneously said ion collecting means and said valve means, and comparison means for comparing the determination of said nuclear radiation detector before the actuation of said control means, which is stored in said capacitor, and the determination of said nuclear radiation detector after the actuation of said control means, said comparison means comprising a first and a second triode each including one cathode grounded through a resistor, said cathodes being connected through an apparatus adapted to indicate the potential difference therebetween, whereas the grids are connected through a switch, the grid of said first triode being furthermore connected to the output of said radiation detector and the grid of said second triode being connected to one plate of said capacitor having the other plate thereof grounded, said control means also controlling the opening of said switch disposed between said grids.

References Cited in the file of this patent

UNITED STATES PATENTS

| 2,576,616 | Livingston | Nov. 27, 1951 |
| 2,599,922 | Kanne | June 10, 1952 |
| 2,823,179 | Snell | Feb. 11, 1958 |
| 2,987,459 | Labeyrie et al. | June 6, 1961 |

FOREIGN PATENTS

| 1,127,618 | France | Dec. 20, 1956 |
| 793,297 | Great Britain | Apr. 16, 1958 |

OTHER REFERENCES

Ser. No. 376,930, Peycelon (A.P.C.), published May 25, 1943.

Starting Up EBWR, by J. W. Harrer, from Nucleonics, July 1957; pages 60–64.